United States Patent [19]

Fritsch

[11] Patent Number: 4,698,712
[45] Date of Patent: Oct. 6, 1987

[54] CLEANING DEVICE

[75] Inventor: Joseph F. Fritsch, Dublin, Ireland

[73] Assignee: Roxanne Yvonne Fritsch, Dublin, Ireland

[21] Appl. No.: 832,202

[22] Filed: Feb. 24, 1986

[30] Foreign Application Priority Data

Feb. 25, 1985 [IE] Ireland .................................. 461/85

[51] Int. Cl.⁴ .............................................. G11B 5/41
[52] U.S. Cl. .................................................... 360/128
[58] Field of Search ............................. 360/128, 137; 15/DIG. 12–DIG. 13

[56] References Cited

FOREIGN PATENT DOCUMENTS 0114115 7/1984 European Pat. Off. ............ 360/128
58-6519 1/1983 Japan .................................. 360/128

Primary Examiner—A. J. Heinz
Attorney, Agent, or Firm—Sughrue, Mion, Zinn, Macpeak, and Seas

[57] ABSTRACT

A cleaning device for cleaning the elements in the tape path, such as the sound head and capstan, pinch roller of a cassette player recorder, the cleaning device comprises a housing with brush members projecting from a front opening to clean the elements. The brush members are mounted on a support member and carrier members. A drive means drives the support member with an oscillating action. The carrier members are driven by the support member so that oscillation of the support member pivots the carrier members inwardly and outwardly of the opening so that the brush members wipe the elements. A reciprocating member driven by the drive means intermittently rotates the feed spindle of the cassette player recorder.

18 Claims, 11 Drawing Figures

CLEANING DEVICE

BACKGROUND TO THE INVENTION

1. Field of the Invention

The present invention relates to a cleaning device for cleaning certain elements in the tape path, such as, the sound head, capstan and pinch roller, tape guides, erase head and the like of a tape cassette player recorder of the type having a cassette receiving area and a take-up and a feed spindle in the cassette receiving area for engaging tape spools of a tape cassette.

2. Discussion of the Prior Art

Such cleaning devices for cassette player recorders are known, for example, British Patent Specification No. 2086639 discloses such a cleaning device. The device of this British Patent comprises a housing which is substantially similar to the housing of a tape cassette. A pair of gear wheels are rotatably mounted in the cassette, one engaging each of the spindles in the cassette receiving area. An intermediate gear transmits drive from one gear to the other. An eccentrically mounted member on the intermediate gear drives a reciprocating member at the free end of which is mounted a pice of cleaning felt which bears on the sound head of the cassette player recorder, and the reciprocating action imparted by the eccentric member causes the cleaning member to wipe backwards and forwards across the sound head. In this particular cleaning device a pair of felt members are provided on each side of the cassette housing for bearing on the capstan and pinch roller assembly for cleaning.

This device suffers from a number of disadvantages. Firstly, because the two felt members on each side of the housing are statically mounted, the cleaning action is passive. This presents considerable problems when the capstan and pinch roller are protected by a guard, or mounted slightly behind a guide or erase head as is often the case. Such guards, guides or erase heads effectively prevent contact between the passive felt cleaning members and the capstan and pinch roller. Thus, it will be appreciated only limited cleaning of the capstan and pinch roller can be achieved, and in some cases, virtually no cleaning of the capstan and pinch roller is achieved.

A second disadvantage is caused by the fact that the cleaning member for cleaning the sound head and the capstan and pinch roller assembly is a solid piece of felt. It has been found that the cleaning action which can be achieved by the felt is limited, in that because the felt is a fairly rigid type of material, only line or point contact between the cleaning felt and the sound head and capstan and pinch roller can be achieved. Thus, if either the felt or the sound head are slightly off-line, only portion of the sound head is cleaned. A further disadvantage using felt is where the sound head is provided with guide members on each side to guide the passage of the tape thereacross. In such case, the guide members prevent adequate cleaning of the sound head by the felt cleaning member in that the felt cleaning member cannot penetrate into the crevices and corners between the sound head and the guide members.

A further and very important disadvantage of most known cleaning devices is that in general, such devices only clean a limited surface area of the various elements. In other words, they only clean along the very narrow path over which the tape passes. It has been found that most large dirt deposits which collect on these elements tend to collect, not on the portion of the element over which the tape passes, but rather on each side of the path along which the tape passes. This is probably due to the fact that the tape, by virtue of the fact that it wipes past these elements, has a certain inherent cleaning ability. However, the problem that is caused by these dirt deposits is that when they are touched by the tape, they become dislodged, and thus interfere with the operation of the elements. It will therefore be appreciated that where a cleaning device uses a felt cleaning member, because of the relative rigidity of the felt, the cleaning member does not clean beyond the tape path.

Similarly, where cleaning devices using cleaning tapes are used, a similar problem arises, in that the cleaning tape only cleans the portion of the elements over which the tape passes.

A further disadvantage of this device is that by virtue of the fact that the take-up spindle has to drive the feed spindle continuously, energy is absorbed in driving the spindle which could otherwise have been used for cleaning. In many cassette player recorders, it is essential that the feed spindle should rotate for at least part of the time, otherwise, control protection devices in the cassette player recorder would shut down the cassette player. However, continuously driving the spindle in its feed spindle absorbs unnecessary quantities of energy.

Other cleaning devices operate on substantially similar principles to that disclosed in the specification of British Patent Specification No. 2086639 and accordingly, similar comments apply.

There is therefore a need for a cleaning device which overcomes the problems of these known cleaning devices.

OBJECTS OF THE INVENTION

One object of the invention is to provide a cleaning device with a cleaning member which actively cleans the capstan and pinch roller as well as other important elements in the tape path, such as, the erase head, guide pins, shut off mechanisms and the like of a cassette player recorder. Another object of the invention is to provide a cleaning device which cleans the sound head with effective cleaning action irrespective of whether guide means for the tape are provided on both or one side of the sound head. It is also an object of the invention to provide a clening device in which the cleaning members are moved intermittently to allow a solvent on the cleaning member sufficient time to soak into the dirt between cleaning strokes and to provide additional energy for the actual cleaning stroke.

Another object of the invention is to provide a cleaning device which cleans the portions of the various elements beyond the area over which the tape passes.

A further object of the invention is to provide a cleaning device in which energy is not unnecessarily used in driving the feed spindle, thereby reducing the amount of available energy for cleaning. It is also an object of the invention to provide a cleaning device which can readily easily be manufactured and it is an object of the invention also to provide a cleaning device which is relatively inexpensive.

A further object of the invention is to remove static electricity from the elements to be cleaned.

SUMMARY OF THE INVENTION

According to the invention there is provided a cleaning device for cleaning certain elements in the tape path of a cassette player/recorder, the cassette player/recorder having a cassette receiving area and take-up and a feed spindle in the cassette receiving area for engaging the tape spools of a cassette tape, the cleaning device comprising:

a housing for engaging in the cassette receiving area, the housing having a front face which, in use, is adjacent the elements to be cleaned, and at least a portion of the front face being open, a main cleaning means mounted in the housing adjacent the open portion thereof for cleaning the sound head in the cassette player/recorder, a secondary cleaning means movably mounted on the housing adjacent the open portion thereof for cleaning another element in the tape path of the cassette player/recorder, and drive transmission means engagable with the secondary cleaning means for movement thereof, and engagable in use with the take-up spindle in the cassette receiving area.

Preferably, the secondary cleaning means comprises a brush member.

In one embodiment of the invention, the secondary cleaning means comprises an elongated carrier member pivotal toward and away from the open portion of the front face.

Advantageously, the brush member comprises a backing member having bristles extending therefrom, the backing member being releasably engagable with the carrier member.

Preferably, a pair of carrier members are provided, pivotal at opposite ends of the housing.

In another embodiment of the invention the main cleaning means comprises a support member carrying a brush member the support member being mounted in the housing adjacent the front face thereof for oscillation so that the brush member wipes backwards and forwards across the sound head, the free end of each carrier member being in slidable engagement with the oscillating support member, so that as the support member oscillates the carrier members are pivoted.

Advantageously, the drive transmission means comprises a pair of meshing gears having intermittently disposed teeth around the periphery thereof, a pair of teeth engaging members extending from the oscillating support member one to engage the intermittent teeth of each gear, so that as the teeth engaging members are alternatively struck by an intermittent gear, the support member oscillates.

In a further embodiment of the invention, a reciprocating member driven by the drive transmission means is engagable in use with the feed spindle to at least partly rotate the feed spindle on rotation of the take-up spindle.

In a still further embodiment of the invention, flexible members to engage the feed spindle are provided on the reciprocating member. Advantageously, the housing is substantially similar to the housing of a tape cassette.

Preferably, some of the brush bristles are of an electrically conductive material.

Additionally, the invention provides a cleaning device for cleaning the sound head of a cassette player recorder, the cassette player recorder having a cassette receiving area, and a take-up and a feed spindle in the cassette receiving area for engaging the tape spools of a tape cassette, the device comprising a housing for engaging in the cassette receiving area, the housing having a front face which, in use, is adapted to be adjacent the sound head, and at least portion of the front face being open, a main cleaning means movably mounted on the housing for cleaning the sound head, drive transmission means engagable, in use, with the take-up spindle, and a reciprocating member engagable with the drive transmission means and the feed spindle for at least partly rotating the feed spindle as the take-up spindle rotates.

ADVANTAGES OF THE INVENTION

The advantages of the invention are many. The main advantage of the invention is that by virtue of the fact that the secondary cleaning means for cleaning the element in the tape path is movable in the housing, and in particular, where it is pivotal in the housing to pivot towards and away from the front face of the housing, active cleaning of these elements is achieved. Thus, considerably better cleaning of these elements is achieved than in devices known heretofore, particularly in the case of the elements which do not move. Further, where the cleaning means for these elements are provided by brush members, by virtue of the fact that the bristles when bearing on the elements fan outwardly, considerably greater area of these elements is cleaned than in devices known heretofore. Additionally, the use of a brush member allows a wider cleaning member to be used in that the bristles, being flexible, go around obstacles which may be met by the brush. Another advantage of the invention is that by virtue of the fact that the feed spindle in the cassette receiving area of the cassette player recorder is only intermittently driven by the reciprocating member, considerably less energy is used in rotating the feed spindle than in devices known heretofore, and accordingly, more energy is available for cleaning.

Furthermore, another advantage of the invention is that where the cleaning means for cleaning the sound head is provided by a brush member, considerably better cleaning of the sound head is achieved. For example, when the bristles abut the sound head, they fan out, thus cleaning a greater area of the sound head than devices known heretofore. Furthermore, bristles also permit cleaning in around the corners between the guide means and the sound head, thereby providing considerably better cleaning than can be achieved by devices known heretofore. Where some of the bristles are of electrically conducting material, any static electricity charge which builds up on the elements is removed.

These and other objects and advantages of the invention will be readily apparent from the following description of a preferred embodiment thereof, given by way of example only, with reference to the accompanying drawings.

DETAILED DESCRIPTION OF THE INVENTION

Figure 11:
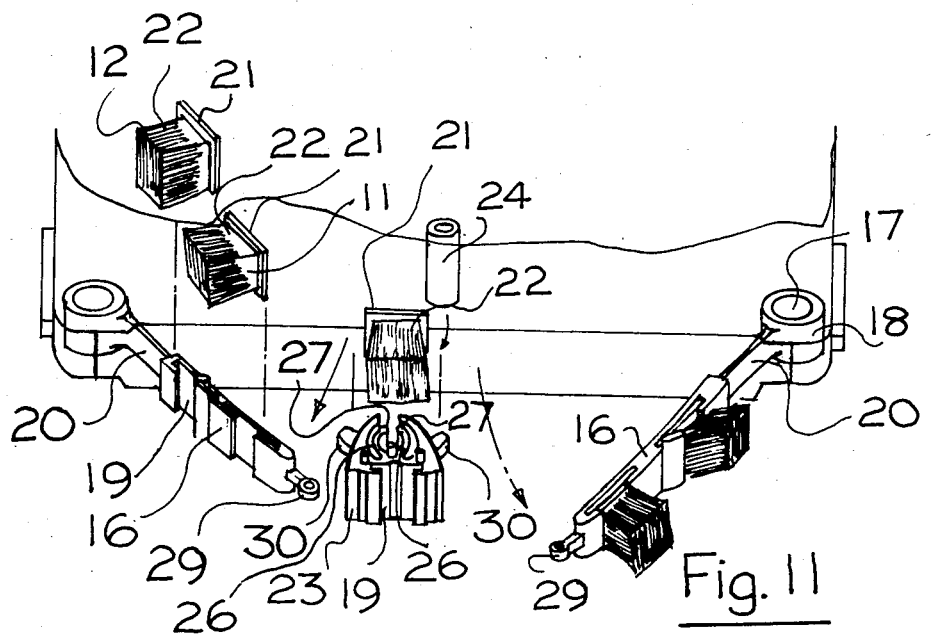
FIG. 11 is a perspective view of the portion of FIG. 10 in a different position.
Figure 10:
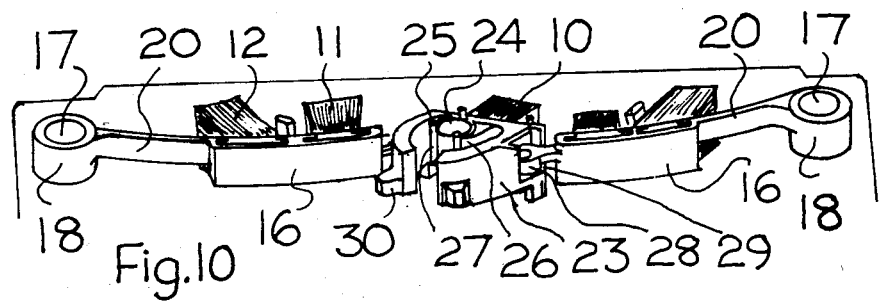
FIG. 10 is a perspective view of a further portion of the device of FIG. 1.
Figure 1:
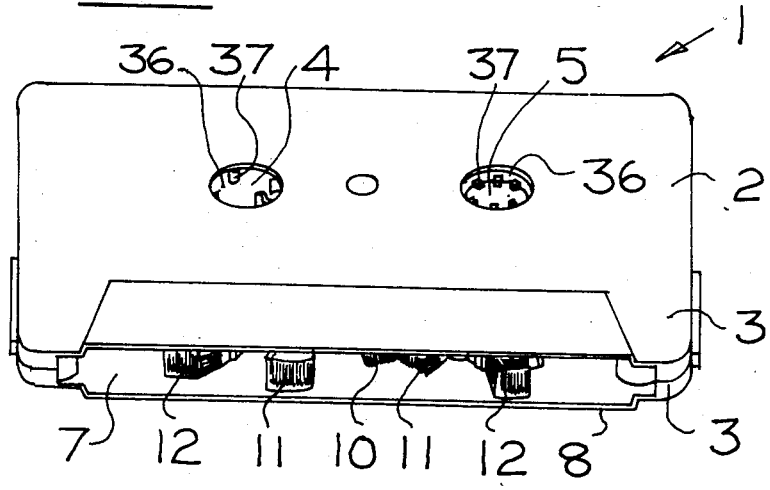
FIG. 1 is a perspective view of a cleaning device according to the invention.
Figure 3:
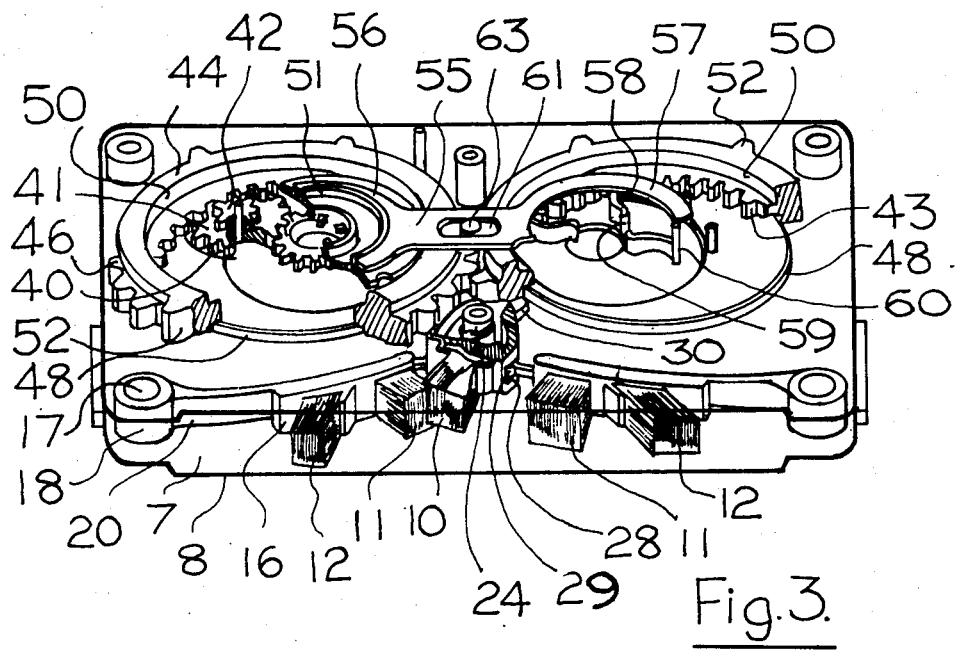
FIG. 3 is a partly-cut away perspective view of the cleaning device of FIG. 1.
Figure 2:
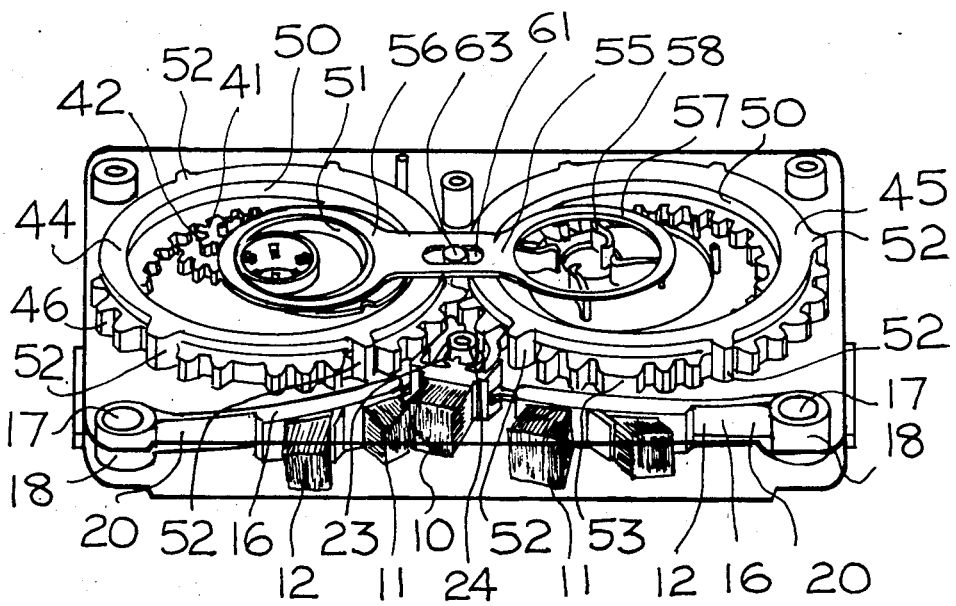
FIG. 2 is a perspective view of the cleaning device of FIG. 1 with a portion of the housing removed.
Figure 4:
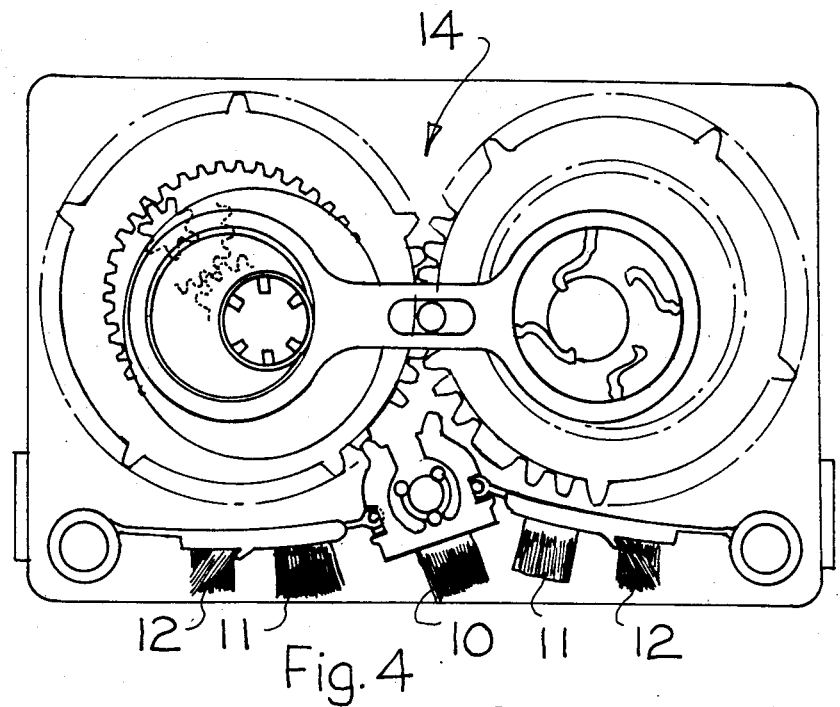
FIG. 4 is a plan view of the cleaning device of FIG. 1.
Figure 5:
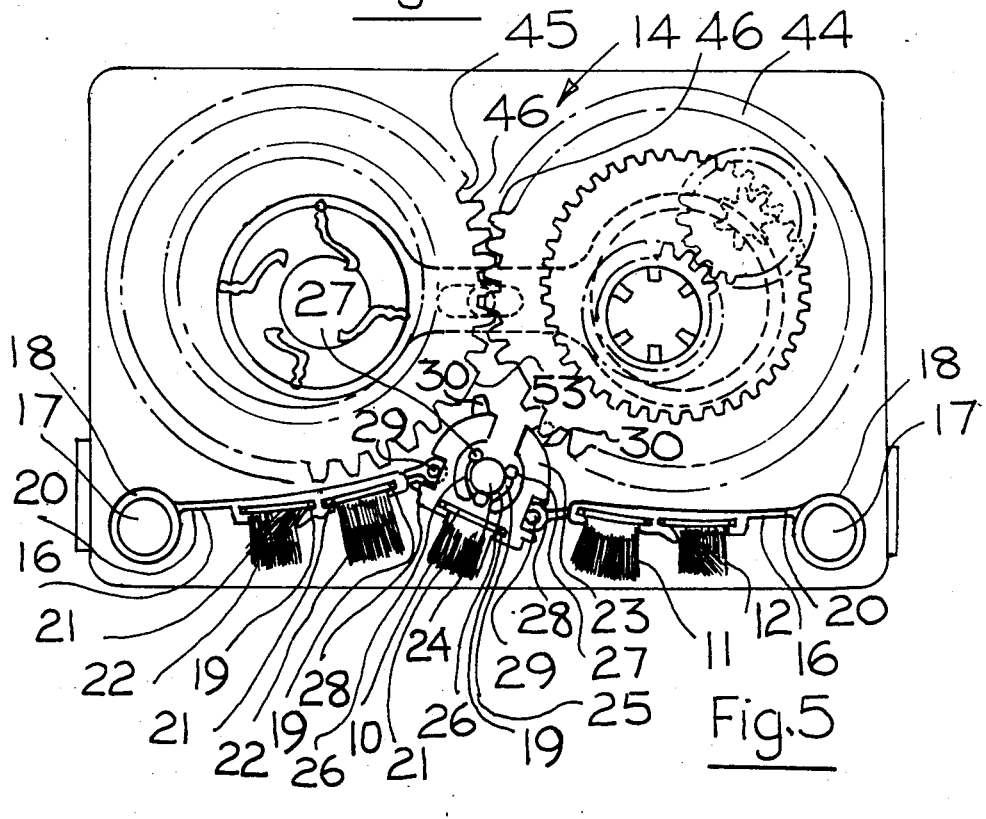
FIG. 5 is an underneath plan view of the cleaning device of FIG. 1.
Figure 6:
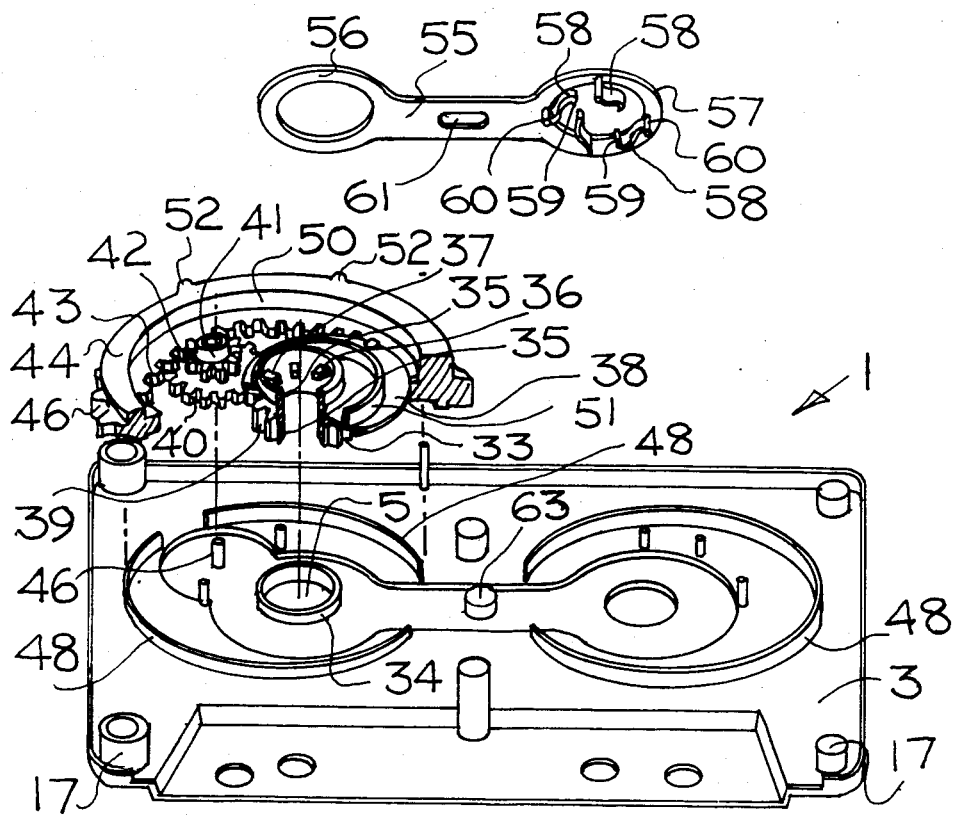
FIG. 6 is an exploded perspective view of the device of FIG. 1.
Figure 7:
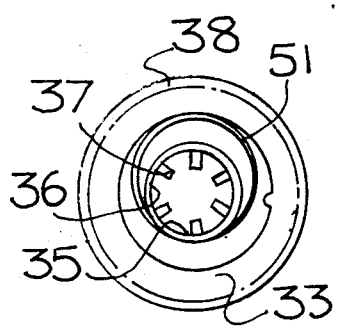
FIG. 7 is a plan view of a detail of the device of FIG. 1.

Referring to the drawings, there is provided a cleaning device according to the invention indicated generally by the reference numeral 1 for cleaning the sound head, capstan and pinch roller assembly, and other elements, (none of which are shown) in the tape path of a cassette player recorder (also not shown). The device 1 comprises a cassette housing 2 of injection moulded plastics material for engaging a cassette receiving area of the cassette player recorder. The housing 2 is formed in two halves 3 and is substantially similar to a conventional tape cassette housing. Openings 4 and 5 are provided in each half 3 of the housing 2 to accommodate the feed and take-up spindles respectively which are provided in the cassette receiving area of the cassette player recorder. An opening 7 is provided in the front portion 8 of the device 1 which, in use, abuts the sound head, capstan pinch rollers assembly and other elements of the player. A main cleaning means, in this case a brush member 10 for cleaning the sound head is provided in the opening 7. Secondary cleaning means, namely, brush members 11 and 12 clean the capstan, pinch roller assemblies, erase head and other elements. A drive transmission means 11 is provided in the housing 2 for driving the brush members 10, 11 and 12 as will be described below.

The secondary cleaning means comprises a pair of elongated carrier members 16 which are pivotal on shafts 17 extending between the halves 3 of the housing 2 and moulded integrally with each half. Each carrier member 16 is of injection moulded plastics material, and comprises a bearing member 18 which pivotally engages the shafts 17. A pair of rebated recesses 19 are provided to slidably and releasably support the brush members 11 and 12. A flexible portion 20 joins the bearing member 18 with the recessed portion 19. Each brush member 11 and 12 comprises a base member 21 with soft bristles 22 extending therefrom. Some of the bristles 22 are of electrically conductive material. Each base member 21 slidably engages a recess 19.

A support member 23 of injection moulded plastics material for supporting the sound head brush member 10 is mounted on a pivot shaft 24 for oscillating motion of the member 23. The shaft is formed in two halves, one being formed integrally on each half 3 of the housing 2. The brush member 10 is similar to the brush members 11 and 12 and a related recess 19 is provided in the support member 23 to slidably, releasably receive the base member 21 of the brush member 10. The support member 23 comprises a central partly circular bearing member 25 which engages the shaft 24 with a snap-on action. The portions 26 of the bearing member 25 each terminate in a thickened portion 27 to ensure a snap-on fit on the shaft 24. A pair of slots 28 are provided on each side of the support member 23 to engage corresponding pivot members 29 on the free ends of each carrier member 16 to facilitate slidable and pivotal movement of the support member 23 with the pivot members 29, so that as the support member 23 oscillates, the carrier members 16 are pivoted alternatively inwardly and outwardly, so that the brush members 11 and 12 wipe past the capstan and pinch roller assembly and other elements. A pair of rearwardly directed members 30 extending from the support member 23 engage the drive means for oscillating the support 23 as will now be described.

Figure 8:
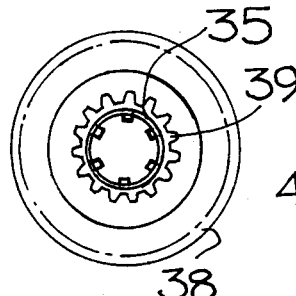
FIG. 8 is an underneath plan view of the detail of FIG. 6.
Figure 9:
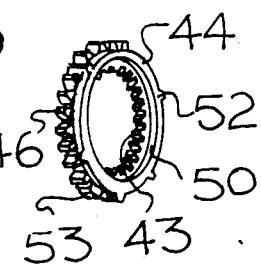
FIG. 9 is a perspective view of another portion of the cleaning device of FIG. 1.

The drive transmission means 14 comprises a drive member which in this case is provided by a drive gear 33 rotatably mounted in the housing. A pair of projecting rings 34 extending inwardly of each opening 6 in the housing 2 rotatably engages corresponding recesses 35 in a bore 36 of the gear 33. Inwardly directed pins 37 act as splines to engage corresponding splines on the take-up spindle (not shown) of the cassette player recorder. On one side of a disc 38 extending around one end of the gear 33 is provided an eccentric ring 51 which will be described below. On the other side, gear teeth 39 are provided to engage corresponding gear teeth 40 on an intermediate gear 41. A smaller gear 42 integrally moulded with the gear 41 engages an internal ring gear 43 of one of a pair of meshing gear members 44 and 45. The gear members 44 and 45 mesh by means of peripheral gears 46. A pair of pins 47 integrally moulded with the halves 3 of the housing 2 rotatably support the intermediate gear 41. A pair of ring portions 48 extending from each half 3 of the housing 2 rotatably engages corresponding rims 50 on the meshing gears 44 and 45. As can be seen in FIG. 8 on the meshing gears 46 extend over only portion of the width of the outer periphery of the rims 50 of each meshing gear 44 and 45. Intermittent teeth 52 extend the full width of the rims 50. These intermittent teeth 52 are provided to engage the rearwardly extending members 30 of the support member 23, so that on rotation of the meshing gears 44 and 45 the members 30 are alternatively struck by the intermittent teeth 52, thereby causing the support member 23 to oscillate. This in turn causes the carrier members 16 to pivot. The teeth 52 are positioned so that between each stroke of the support member there is a pause. In other words, the strokes are intermittent. Where a solvent is used on the brush members, this pause permits the solvent to soak into the dirt, thus making it easier to remove on the next stroke of the cleaning member. For ease of assembly, one tooth is omitted in the external gear ring 46 and a corresponding double tooth 53 is provided. The meshing gears 44 and 45 are identical, and accordingly, during assembly, they are assembled with the double tooth 53 engaging the portion with the missing tooth. This ensures that the intermittent teeth 52 are synchronised so that the members 30 are alternatively struck.

Returning now to the eccentric ring 51, this drives a reciprocating member 55 of injection moulded plastics material which at one end has a bearing ring 55 in rotatable engagement with the eccentric ring 51. A ring member 57 is provided at the other end of the reciprocating member 55 which, in use, encircles the feed spindle (not shown) of the cassette player recorder. A plurality of flexible members 58 with inwardly directed tongues 59 extend inwardly from posts 60 arranged around the ring member 57. The tongues 59 as the reciprocating member 55 reciprocates wipe across the splines of the feed spindle, thereby causing it to rotate intermittently. A slot 61 in the member 55 engages a spud 63 intergrally moulded with one-half 3 of the housing 2 to constrain the member 55 to move with reciprocating action.

In use, the device 1 is mounted in the cassette receiving area of a cassette player recorder, so that the drive gear 33 engages the take-up spindle of the cassette player recorder. The play button of the cassette player recorder is activated. As the take-up spindle rotates the drive gear 33 rotates with it, thus rotating the meshing gears 44 and 45 through the intermediate gears 41 and 42. Rotation of the gears 44 and 45 causes the intermittent teeth 52 to alternatively strike the rearwardly directed members 30 thereby oscillating the support member 23 and in turn the sound head brush 10. The oscillating motion of the support member 23 causes the carrier member 16 to pivot, thus wiping the capstan and pinch roller assembly with the brush members 11 and 12. Rotation of the drive gear 33 also causes the reciprocating member 55 to reciprocate, thereby intermittently driving the feed spindle by means of the flexible members 58. Thus, once the feed spindle is at least intermittently driven, the cassette player recorder continues to operate, thereby continuing the cleaning action. In general, a cleaning fluid would normally be applied to the brush members, prior to inserting the device in the cassette player recorder.

Should it be necessary to replace any of the brush members, this can readily easily be achieved by pulling out the support member 23 through the opening 7. Thus, the bearing member 25 of the support member 23 is disengaged from the shaft 24. This in turn, moves the carrier members 16 out through the opening 4 as can be seen in FIG. 11. The brush members 10, 11 and 12 can then readily easily be removed from their appropriate rebated recesses 19 and replaced with fresh brushes. By pressing the support member 23 in through the opening 7, the bearing member 25 snaps on to the shaft 24 and the device is ready again for operation.

It has been found that by using relatively soft long bristles in the brush members a superior cleaning action is achieved. This is particularly noticeable in the case of cassette player recorders where the sound head is protected by guides to guide the tape across the sound head. The relatively long bristles are capable of penetrating into the recesses, corners and crevices formed between the edges of the sound head and the guide means.

Furthermore, the use of relatively long bristles causes the bristles to fan out when abutting either the sound head, the capstan and pinch roller assembly, and other elements of the device, which in turn causes a considerably greater surface area of these elements to be cleaned than has been possible in devices known heretofore. Thus, dirt which builds up on the elements on both sides of the tape path is removed. Further, where the bristles are relatively soft, they fan out better.

Furthermore, by virtue of the fact that an intermediate gear is disposed between the meshing gears and the drive gear, a considerable gear ratio reduction is achieved. This thereby causes the brushes to rotate relatively slowly, and accordingly with considerably greater cleaning force.

Further, by virtue of the fact that a reciprocating member is used to only intermittently drive the feed spindle, considerably more energy is available for cleaning than in devices known heretofore, where a considerable amount of energy is utilized in merely rotating the feed spindle.

It will be appreciated that while particular arrangements of reciprocating member have been used to intermittently drive the feed spindle, any other suitable intermittent drive means could be used without departing from the scope of the invention. For example, the ring member supporting the flexible members could be dispensed with, and in certain cases, only one flexible member may be provided to wipe past the splines of the feed spindle. Indeed, it will be appreciated that flexible members could be dispensed with if desired.

It will also of course be appreciated that the reciprocating member could be driven from any other suitable gear.

Additionally, it will be appreciated that other drive tranmission means besides those described could be used. For example, it is envisaged in certain cases that the oscillating motion of the support member could be achieved by a single gear member, which could drive, for example, a linear gear rack backwards and forwards. Further, it will be appreciated that a support member of any other construction could be used for supporting the brush member for the sound head. Indeed, it will, of course, be appreciated that any suitable cleaning means besides a brush member could be used for cleaning the sound head, and similarly, other suitable cleaning means for cleaning the capstan and pinch roller assembly and other elements could be used without departing from the scope of the invention. It will, of course, be appreciated that where brush members are used, it is not necessary that they be releasably mounted. Neither, is it necessary that the support member should be releasably mounted. Furthermore, it is not necessary that the main cleaning means be movable, although this is preferable.

It will also of course be appreciated that while a particular type of housing has been described which is substantially similar to a cassette tape housing, any other suitable shape or construction of housing could be provided. In fact, in certain cases, it is envisaged that the housing could be provided merely by a base member or a framework on which the various members would be mounted and supported. Further, it is envisaged that other constructions of carrier members could be provided for supporting the brush members for cleaning the capstan and pinch roller assembly. Indeed, it will be appreciated that it is not necessary that these members should be pivoted, once they are movable at all, that is sufficient to provide active cleaning of the elements in the tape path. For example, the carrier members could be slidably moveable with a type of reciprocating action backwards and forwards across the front opening of the cassette housing or in and out if desired. It will also of course be appreciated that it is not necessary to provide two brushes on each carrier member, and in certain cases, it is envisaged that the support member and brush member for the sound head may be dispensed with altogether, and in other cases it is envisaged that it may be mounted on a single carrier member, which would reciprocate backwards and forwards across the opening. In which case, brush members for cleaning the other elements could also be provided on such a carrier member. Needless to say, it will be appreciated that while the housing and components of the cleaning device have been described as being of injection moulded plastics material, they could be of any other suitable material, and indeed, where of plastics material, they could be formed by other means besides injection moulding, for example, fabrication or the like.

It is also envisaged that where meshing gears with intermediate teeth are used, these could be driven directly from the drive gear without the need for an intermediate gear. In fact, in certain cases, it will be appreciated that a single gear would be adequate for oscillating the support member, if the support member were biased towards the gear. In fact, it will of course be appreciated that all that is necessary is one single member to strike the support member, and in which case the support member would oscillate once for each revolution of the gear.

While the brush members have been described as having electrically conductive bristles this is not necessary. They may be dispensed with altogether or in certain cases other electrically conductive means for removing the static electric charges could be used.

What is claimed is:

1. A cleaning device for cleaning certain elements in the tape path of a cassette player/recorder, the cassette player/recorder having a cassette receiving area and a take-up and feed spindle in the cassette receiving area for engaging the tape spools of a cassette tape, the cleaning device comprising:
   a housing for engaging in the cassette receiving area, the housing having a front face which, in use, is adjacent the elements to be cleaned, and at least a portion of the front face being open,
   a main cleaning means mounted in the housing adjacent the open portion thereof for cleaning a sound head of the cassette player/recorder,
   a secondary cleaning means movably mounted in the housing adjacent the open portion thereof for cleaning another element in the tape path of the cassette player/recorder, the secondary cleaning means comprising;
   a secondary cleaning member, and
   an elongated carrier member extending across a portion of the open portion of the front face, the carrier member having a first end and a second end and being pivotally mounted in the housing about a fixed pivot axis, and the secondary cleaning member being mounted on the carrier member at a position longitudinally spaced apart from the pivot axis so that as the carrier member pivots about the pivot axis the cleaning member moves towards and away from the open portion of the front face, and
   drive transmission means for transmitting a driving force from the take-up spindle to the carrier member for pivotal movement thereof, the drive transmission means being engagable with the carrier member, and engagable in use with the take-up spindle in the cassette receiving area.

2. A cleaning device as claimed in claim 1 in which the secondary cleaning means comprises a brush member.

3. A cleaning device as claimed in claim 2 in which the brush member comprises a backing member having bristles extending therefrom, the backing member being releasably engagable with the carrier member.

4. A cleaning device as claimed in claim 3 in which some of the brush bristles are of an electrically conductive material.

5. A cleaning device as claimed in claim 1 in which said first end of the carrier member is pivotally mounted adjacent one end of the housing, and a portion of the carrier member adjacent the pivot end is of flexible material.

6. A cleaning device as claimed in claim 1 in which a pair of carrier members are provided, pivotally mounted at opposite ends of the housing.

7. A cleaning device as claimed in claim 1 in which the main cleaning means comprises a support member carrying a brush member, the support member being mounted in the housing adjacent the front face thereof for oscillation so that the brush member wipes backwards and forwards across the sound head, the second end of each carrier member being in slidable engagement with the oscillating support member, so that as the support member oscillates the carrier members are pivoted.

8. A cleaning device as claimed in claim 7 in which the drive transmission means comprises a pair of meshing gears having intermittently disposed teeth around the periphery thereof, a pair of teeth engaging members extending from the oscillating support member, one to engage the intermittent teeth of each gear, so that as the teeth engaging member are alternatively struck by an intermittent tooth, the support member oscillates.

9. A cleaning device as claimed in claim 8 in which a drive member rotatable in the housing is engagable with the take-up spindle in the cassette receiving area, the meshing gears being driven by the drive member.

10. A cleaning device as claimed in claim 9 in which the drive member is provided by a gear which drives the meshing gears through an intermediate gear.

11. A cleaning device as claimed in claim 9 in which the drive member has a bore with internally arranged splines to engage corresponding splines on the spindle in the cassette receiving area.

12. A cleaning device as claimed in claim 1 in which a reciprocating member driven by the drive transmission means is engagable in use with the feed spindle to at least partly rotate the feed spindle on rotation of the take-up spindle.

13. A cleaning device as claimed in claim 12 in which flexible members to engage the feed spindle are provided on the reciprocating member.

14. A cleaning device as claimed in claim 12 in which the reciprocating member terminates in a ring which, in use, extends around the feed spindle, the flexible members being inwardly directed of the ring.

15. A cleaning device as claimed in claim 1 in which the housing is substantially similar to the housing of a tape cassette.

16. A cleaning device as claimed in claim 1 in which each cleaning means is intermittently driven.

17. A cleaning device for cleaning certain elements in the tape path of a cassette player/recorder, the cassette player/recorder having a cassette receiving area and a take-up and a feed spindle in the cassette receiving area for engaging the tape spools of a cassette tape, the cleaning device comprising:
   a housing for engaging in the cassette receiving area, the housing having a front face which, in use, is adjacent the elements to be cleaned, and at least a portion of the front face being open,
   a main cleaning means mounted in the housing adjacent the open portion thereof for cleaning a sound head of the cassette player/recorder, the main cleaning means comprising:
   a cleaning member,
   a support member, the cleaning member being mounted on the support member, the support member being arranged in the housing adjacent the front face thereof for oscillation, so that the cleaning member wipes backwards and forwards across the sound head, and a pair of teeth engaging members extending from the support member, a secondary cleaning means movably mounted in the housing adjacent the open portion thereof for cleaning another element in the tape path of the cassette player/recorder, and drive transmission means for transmitting a driving force from the take-up spindle to the main cleaning means for movement thereof, the drive transmission means comprising;

a pair of meshing gears having intermittently disposed teeth around the periphery thereof, to engage the teeth engaging members of the oscillating support member so that as the teeth engaging members are alternatively struck by an intermittent tooth the support member oscillates, and drive means engagable, in use, with the take-up spindle in the cassette receiving area to drive one of the meshing gears.

18. A cleaning device for cleaning certain elements in the tape path of a cassette tape/recorder, the cassette player/recorder having a cassette receiving area and a take-up and a feed spindle in the cassette receiving area for engaging the tape spools of a cassette tape, the cleaning device comprising;

a housing for engaging in the cassette receiving area, the housing having a front face which, in use, is adjacent the elements to be cleaned, and at least a portion of the front face being open, a main cleaning means mounted in the housing adjacent the open portion thereof for cleaning the sound head in the cassette player/recorder, the main cleaning means being mounted for oscillation so that the cleaning means wipes backwards and forwards across the sound head, a secondary cleaning means mounted in the housing adjacent the open portion thereof for cleaning another element in the tape path of the cassette player/recorder, the secondary cleaning means being movable toward and away from the open portion of the housing, and drive transmission means for driving the main and secondary cleaning means, the drive transmission means comprising means for driving each said cleaning means with intermittent movement to cause each said cleaning means to pause between each movement, said drive transmission means being periodically disengaged from said cleaning means so as to effect said pauses.

* * * * *